Figure 1:
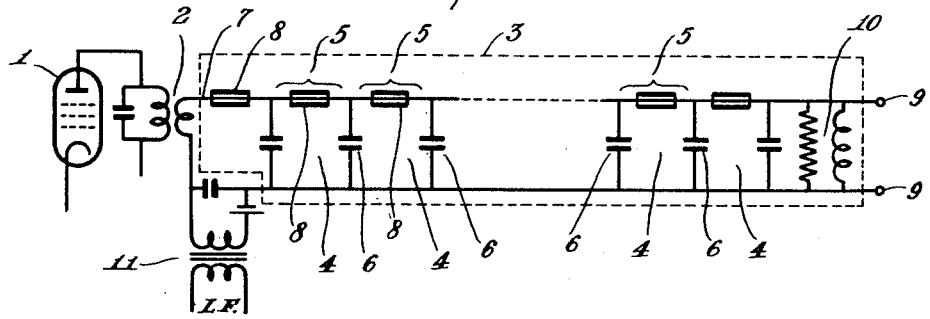

GERARD HEPP
INVENTOR.

BY [signature]

AGENT.

Patented Aug. 21, 1951

2,565,231

UNITED STATES PATENT OFFICE 2,565,231

VARIABLE ARTIFICIAL TRANSMISSION LINE FOR EFFECTING PHASE MODULATED OSCILLATIONS

Gerard Hepp, Eindhoven, Netherlands, assignor to Hartford National Bank and Trust Company, Hartford, Conn., as trustee Application December 19, 1947, Serial No. 792,746
In the Netherlands January 4, 1947

4 Claims. (Cl. 332—51)

The invention relates to a circuit-arrangement for electrically influencing the propagation constant of a network in the form of an artificial network and more particularly for modulating the phase of an electrical oscillation with the aid of such a network.

In a known circuit-arrangement for generating phase-modulated oscillations the oscillations required to be modulated are supplied to a network comprising a number of sections connected in cascade each of which consists of a series-inductance and a parallel-capacity; these series-inductances each comprise a core of ferro-magnetic material the permeability of which may be modulated with the aid of a magnetizing current flowing through a magnetizing winding provided on the core; the phase-modulated oscillations are now taken from the output terminals of the network. In order to be able to magnetize the cores to a sufficient extent with the aid of a small amount of magnetizing energy the cores are constructed so as to be closed without having any air gap. The difficulty thus arises that the high-frequency windings have to be provided on a closed core, which takes very much time. On account of the very small dimensions, to wit, 2 to 3 mms. mechanical manufacture of an annular winding need not be considered. Besides, this circuit-arrangement requires at least one separate magnetizing winding.

The invention has for its object to provide a circuit-arrangement, more particularly for modulating electrical oscillations in phase, wherein this disadvantage is avoided. To that end use is made of an artificial cable.

It is known per se to generate phase-modulated oscillations with the aid of an artificial cable. For this purpose the oscillations required to be modulated are supplied to a network consisting of a number of sections connected in cascade, each of which comprises an inductance coil and a parallel capacity, formed between an auxiliary electrode and the earthed main electrode of a glow-discharge tube. By modulating the voltages applied to these glow-discharge tubes the said parallel-capacities are modulated in value. The circuit-arrangement requires, however, a large number of circuit elements.

The invention provides a circuit-arrangement which is a great deal simpler with respect to the said known circuit-arrangement.

According to the invention, for this purpose the cable is formed by a conductor around which are provided a number of closed sheaths of ferromagnetic material, preferably of ferrite, the permeability of which may be varied with the aid of a pre-magnetizing current flowing through the conductor, the latter being connected, between every two successive ferromagnetic sheaths, to one of the said parallel capacities.

The invention will be explained more fully with reference to the accompanying drawing, which represents, by way of example, one embodiment thereof.

Figure 2:
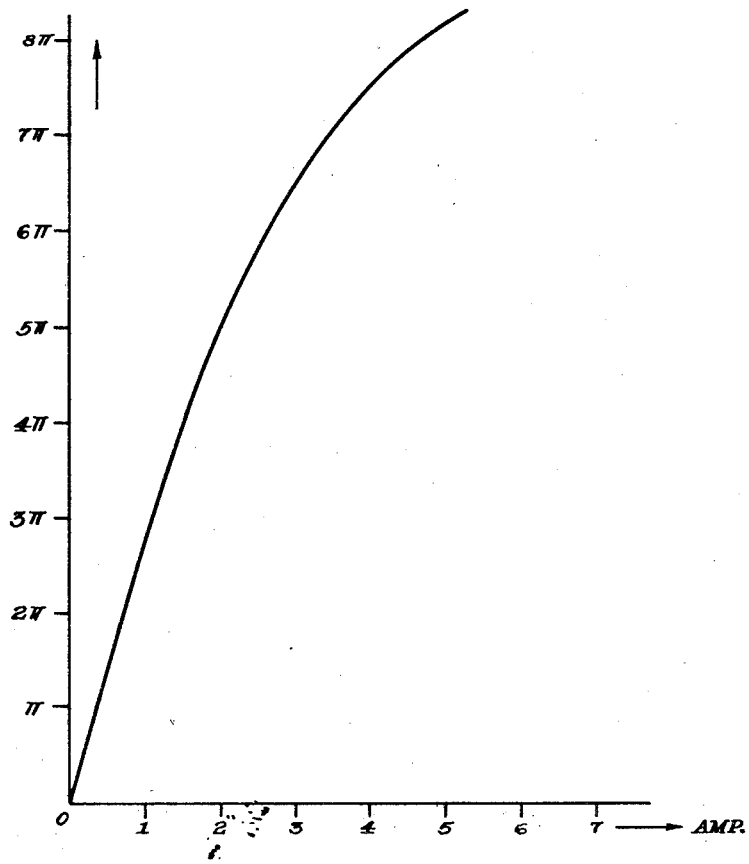

Fig. 1 is a schematic diagram of a circuit for generating phase-modulated oscillations and entailing an artificial line in accordance with the invention, and Fig. 2 is a graph illustrative of the phase rotation effected by the artificial line in Fig. 1 as a function of the pre-magnetizing current flowing therethrough.

In Fig. 1 of the drawing I designates an oscillator tube with the aid of which an oscillation of constant frequency is generated. This oscillation is supplied via a transformer 2 to the input terminals of an artificial cable 3. This cable comprises a number of sections 4, each consisting of a series-inductance 5 and a parallel-capacity 6.

In the above-mentioned known circuit-arrangement for generating phase-modulated oscillations these inductances 5 are provided with closed ferromagnetic cores, the permeability of which may be varied by additional magnetizing windings provided on these cores or, as the case may be, by an additional magnetizing winding common to all the cores, a modulating current being sent through this or these windings. The construction of such inductances takes much time since the high-frequency windings have to be provided on a closed core of very small dimensions.

According to the invention, the inductances 5 are formed by a conductor 7 around which a number of ferromagnetic sheaths 8 are provided, which sheaths are made of a material the permeability of which may be varied by a modulating current flowing through the conductor 7 and supplied thereto via a transformer 11.

The sheaths 8 preferably consist of ferrite and may be provided on the conductor 7, for example, in the form of rings. However, the invention is not restricted to this construction and offers, for example, the possibility of providing the sheaths otherwise, for example, in the form of electrolytically deposited ferromagnetic material.

In each of the sections 4 the high-frequency oscillations supplied via the transformer 2 to the artificial cable 3 are slightly modulated in phase.

Since the sections 4 are connected in cascade, the voltage set up at the output terminals 9 of the artificial cable 3, provided with a terminating impedance 10, is highly modulated in phase. In the graph attached the phase-rotation is represented as a function of the premagnetizing current flowing through the conductor 7. The network in question consists in this case of 64 sections and the frequency of the oscillations supplied to the network was 1.26 megacycle/sec.

Besides for generating phase-modulated oscillations, the above-described circuit-arrangement is also suitable for electrically adjusting the propagation constant of the artificial cable so that the transit time of an electrical impulse supplied to the input of the cable can be modified. In this case it is possible, with the aid of the circuit-arrangement shown in Fig. 1, to effectuate impulse modulation of a series of impulses supplied to the artificial cable.

After the above it is evident that, instead of or in combination with the above-described modulation method, the condensers 6 may comprise dielectrics, such as seignette salt or barium titanate, the dielectric constants of which may be varied by a modulating voltage supplied to the conductor 7, no protection being asked for such a step.

What I claim is:

1. In a system for phase modulating a carrier oscillation in accordance with an intelligence signal, a transmission network possessing a variable delay characteristic comprising; an artificial transmission line including first and second conductors, a plurality of ferrite rings encircling said first conductor along successively spaced positions thereon, each ring and the portion of the first conductor contained therein defining an inductance, and a plurality of capacitances connected respectively between the junction of every two successive inductances and the second conductor, means to pass a polarizing current through said first conductor to impart a predetermined value to said inductances, means to vary the intensity of said polarizing current in accordance with the signal to effect corresponding changes in the delay characteristic of said line, and means to apply the carrier oscillation as an input to said line whereby said oscillation is phase modulated by said signal.

2. In a system for phase modulating a carrier oscillation in accordance with an intelligence signal, a transmission network possessing a variable delay characteristic comprising; an artificial transmission line including first and second conductors, a plurality of ferromagnetic sheaths surrounding said first conductor along successive positions thereon, each sheath and the portion of the first conductor contained therein defining an inductance, a plurality of capacitances connected respectively between the junction of every two successive inductances and the second conductor and input and output terminals connected to opposing ends of said line, a terminating impedance connected across said output terminals, a source of polarizing voltage, and first and second transformers each having a primary and a secondary, the secondaries of said transformers being interconnected in series relation with said source across said input terminals, the carrier oscillation being applied to the primary of said first transformer and the signal being applied to the primary of said second transformer, whereby the oscillation appearing across said output terminals is phase-modulated by said signal.

3. An arrangement, as set forth in claim 2, further including a capacitor shunted across the secondary of said second transformer and having a value at which said capacitor acts as a by-pass for said oscillation.

4. In a system for phase modulating a carrier oscillation in accordance with an intelligence signal, a transmission circuit having a variable propagation characteristic comprising; an artificial line formed by a plurality of sections each including two conductors, a ferrite sheath surrounding one of said conductors to define an inductance and a capacitance connected between one end of said inductance and the other conductor, said sections being connected in cascade relation, means to pass a polarizing current through said cascade-connected sections having an intensity imparting a predetermined value to said inductances, and means to modulate the intensity of said polarizing current in accordance with the signal to effect corresponding variations in the propagation constant of said line, and means to apply the carrier oscillation as an input to said line whereby said oscillation is phase modulated by said signal.

GERARD HEPP.

REFERENCES CITED

The following references are of record in the file of this patent:

UNITED STATES PATENTS

| Number | Name | Date |
|---|---|---|
| 1,677,191 | Loynes | July 17, 1928 |
| 1,737,169 | Osnos | Nov. 26, 1929 |
| 1,792,756 | Osnos | Feb. 17, 1931 |
| 2,077,223 | Crosby | Apr. 13, 1937 |
| 2,085,418 | Crosby | June 29, 1937 |
| 2,443,094 | Carlson et al. | June 8, 1948 |
| 2,445,783 | Labin | July 27, 1948 |